United States Patent
Wu et al.

(10) Patent No.: US 10,129,150 B2
(45) Date of Patent: Nov. 13, 2018

(54) SYSTEMS AND METHODS FOR IMPLEMENTING A SWITCHED CONTROLLER AREA NETWORK

(71) Applicant: Marvell World Trade Ltd., St. Michael (BB)

(72) Inventors: Fei Wu, Beijing (CN); Dehuan Meng, Beijing (CN); Biing Long Shu, Singapore (SG); Hugh Walsh, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 29 days.

(21) Appl. No.: 15/363,955

(22) Filed: Nov. 29, 2016

(65) Prior Publication Data

US 2017/0155584 A1 Jun. 1, 2017

Related U.S. Application Data

(60) Provisional application No. 62/261,583, filed on Dec. 1, 2015, provisional application No. 62/261,611, filed (Continued)

(51) Int. Cl.
*H04L 12/741* (2013.01)
*H04L 12/40* (2006.01)
(Continued)

(52) U.S. Cl.
CPC .......... *H04L 45/745* (2013.01); *B60R 16/023* (2013.01); *H04L 12/40* (2013.01);
(Continued)

(58) Field of Classification Search
CPC ................ H04W 84/18; H04W 76/02; H04L 2012/40215; H04L 45/00; H04L 45/02
See application file for complete search history.

(56) References Cited

U.S. PATENT DOCUMENTS 5,524,213 A    6/1996  Dais et al.
7,307,994 B2*  12/2007 Kurita ................ H04L 12/4135
                                              370/395.3

(Continued)

FOREIGN PATENT DOCUMENTS

EP    1 916 813    4/2008
EP    2 712 123    3/2014

(Continued)

OTHER PUBLICATIONS

Barranco, et al., Boosting the Robustness of Controller Area Networks CANcentrate and ReCANcantrate, Computer, IEEE Computer Society, vol. 42, No. 5, pp. 66-73, May 1, 2009.

(Continued)

*Primary Examiner* — Chandrahas B Patel

(57) ABSTRACT

Systems, methods, and apparatuses are described herein for implementing a switched Controller Area Network ("CAN"). In some embodiments, control circuitry of a bridge may receive a CAN message. The control circuitry may identify a first plurality of nodes to which the CAN message is addressed by comparing a virtual CAN bus identifier of the CAN message to entries of a virtual CAN bus lookup table, and may identify a second plurality of nodes to which the CAN message is addressed by comparing a message identifier ("ID") of the CAN message to entries of a message ID lookup table. The control circuitry may perform a logical AND operation between the first plurality of nodes and the second plurality of nodes, and may transmit the CAN message to a node that satisfies the logical AND operation.

20 Claims, 2 Drawing Sheets

Related U.S. Application Data on Dec. 1, 2015, provisional application No. 62/261,629, filed on Dec. 1, 2015.

(51) Int. Cl.

| | | |
|---|---|---|
| *H04L 12/761* | (2013.01) | |
| *H04L 12/26* | (2006.01) | |
| *H04L 12/755* | (2013.01) | |
| *H04L 12/841* | (2013.01) | |
| *H04L 12/46* | (2006.01) | |
| *B60R 16/023* | (2006.01) | |
| *H04L 12/66* | (2006.01) | |

(52) U.S. Cl.
CPC .. *H04L 12/40143* (2013.01); *H04L 12/40163* (2013.01); *H04L 12/4625* (2013.01); *H04L 12/4633* (2013.01); *H04L 12/4662* (2013.01); *H04L 12/66* (2013.01); *H04L 43/106* (2013.01); *H04L 45/021* (2013.01); *H04L 45/16* (2013.01); *H04L 45/54* (2013.01); *H04L 47/28* (2013.01); *H04L 2012/40215* (2013.01)

(56) References Cited

U.S. PATENT DOCUMENTS

| | | | |
|---|---|---|---|
| 8,650,356 | B2 | 2/2014 | Wilson et al. |
| 9,191,467 | B2 * | 11/2015 | Triess ................. H04L 41/0893 |
| 2006/0109376 | A1 | 5/2006 | Chaffee et al. |
| 2006/0271694 | A1 | 11/2006 | Matsuo et al. |
| 2007/0140294 | A1 | 6/2007 | Takatori |
| 2008/0162860 | A1 | 7/2008 | Sabbatini et al. |
| 2009/0240383 | A1 | 9/2009 | Hung |
| 2010/0329272 | A1 | 12/2010 | Tsuboi et al. |
| 2014/0036693 | A1 | 2/2014 | Mabuchi |
| 2014/0036922 | A1 | 2/2014 | Yousefi |
| 2014/0146666 | A1 | 5/2014 | Kwan et al. |
| 2014/0211803 | A1 | 7/2014 | Yousefi |
| 2014/0215109 | A1 | 7/2014 | Hopfner |
| 2014/0258571 | A1 | 9/2014 | Hartwich et al. |
| 2014/0379954 | A1 | 12/2014 | Hayashi |
| 2015/0003443 | A1 | 1/2015 | Koenigseder |
| 2015/0003456 | A1 | 1/2015 | Seo |
| 2015/0019897 | A1 | 1/2015 | Horihata |
| 2015/0370535 | A1 | 12/2015 | Ralston |
| 2016/0197944 | A1 | 7/2016 | Allouche et al. |
| 2017/0072876 | A1 | 3/2017 | Rajan et al. |
| 2017/0118038 | A1 | 4/2017 | Ujiie et al. |
| 2017/0131610 | A1 | 5/2017 | Brown et al. |

FOREIGN PATENT DOCUMENTS

| | | |
|---|---|---|
| EP | 2 863 588 | 4/2015 |
| WO | WO-01/45348 | 6/2001 |

OTHER PUBLICATIONS

Barranco, et al., ReCANcentrate: A Replicated Star Topology for CAN Networks, 10th IEEE International Conference on Emerging Technologies and Factory Automation, IEEE, vol. 2, pp. 469-476, Sep. 19, 2005.

Herber, et al., Real-Time Capable CAN to AVB Ethernet Gateway Using Frame Aggregation and Scheduling, 2015 Design, Automation & Test in Europe Conference and Exhibition, pp. 61-66, Mar. 9, 2015.

IEEE Std 802.1AS™—2011, "IEEE Standard for Local and Metropolitan Area Networks—Timing and Synchronization for Time-Sensitive Applications in Bridged Local Area Networks," IEEE Computer Society, 292 pages, Mar. 30, 2011.

Kern, et al., Gateway Strategies for Embedding of Automotive CAN-Frames into Ethernet-Packets and Vice Versa, Network and Parallel Computing, Lecture Notes in Computer Science, pp. 259-270, Feb. 24, 2011.

* cited by examiner

SYSTEMS AND METHODS FOR IMPLEMENTING A SWITCHED CONTROLLER AREA NETWORK

CROSS-REFERENCE TO RELATED APPLICATIONS

This patent application claims the benefit of U.S. Provisional Patent Application No. 62/261,583, filed Dec. 1, 2015, currently pending, and also claims the benefit of U.S. Provisional Patent Application No. 62/261,611, filed Dec. 1, 2015, currently pending, and also claims the benefit of U.S. Provisional Patent Application No. 62/261,629, filed Dec. 1, 2015, currently pending, the disclosures of which are each hereby incorporated by reference herein in their entireties.

BACKGROUND

The background description provided herein is for the purpose of generally presenting the context of the disclosure. Work of the inventors hereof, to the extent the work is described in the background section, as well as aspects of the description that may not otherwise qualify as prior art at the time of filing, are neither expressly or impliedly admitted as prior art against the present disclosure.

A Controller Area Network ("CAN") is a serial bus system developed to exchange information between different Electronic Control Units ("ECUs") connected to the bus, where information is exchanged securely and in real time. While CAN was originally developed for circulating commands between components in automobiles, the applications of CAN have expanded to other electronic environments.

A CAN functions by a given ECU broadcasting a frame to all other ECUs that share a CAN bus with the given ECU. All ECUs have an equal opportunity to begin transmitting a message frame whenever the CAN bus is idle, as there are no master or slave nodes. Thus, so long as no other ECU is using the bandwidth of the CAN bus, any given ECU can transmit a frame without delay.

In the event that two ECUs simultaneously detect that the bus is idle, two frames may be transmitted simultaneously and collide. In order to resolve the collision, the CAN protocol, upon detecting the collision, responsively determines which message is of a higher priority, and then transmits the higher priority message first. The priority is determined based on a message Identifier ("message ID") within an arbitration field of a CAN frame. As a consequence, the ability of the lower priority message to be transmitted depends on whether the CAN bus is being used by a different ECU for transmission of a higher priority message. If there are many ECUs on a given bus, and two of those ECUs are of high priority and frequently communicate, a lower priority ECU may experience extremely high latency in its communications because there may be few opportunities to transmit its messages, as the bus will seldom be idle.

SUMMARY

Systems, methods, and apparatuses are provided herein for implementing a switched Controller Area Network ("CAN"). To this end, control circuitry (e.g., at a bridge, such as a switched network bridge), may receive a CAN message. The control circuitry may identify a first plurality of nodes to which the CAN message is addressed by comparing a virtual CAN bus identifier of the CAN message to entries of a virtual CAN bus lookup table, and may identify a second plurality of nodes to which the CAN message is addressed by comparing a message identifier ("ID") of the CAN message to entries of a message ID lookup table. The control circuitry may perform a logical AND operation between the first plurality of nodes and the second plurality of nodes, and may transmit the CAN message to a node that satisfies the logical AND operation.

The CAN message may be a broadcast message, and the logical AND operation may convert the broadcast message to a switched message. For example, the logical AND operation may convert the broadcast message to the switched message by eliminating all but one node to which the CAN message is to be transmitted.

In some embodiments, each entry of the entries of the virtual CAN bus lookup table may include a data field of an address. The data field may be formed by a number of bits equal to a number of CAN nodes connected to the bridge. Each bit may represent whether a given node of the nodes connected to the bridge forms a part of a virtual CAN bus.

Similarly, each entry of the entries of the message ID lookup table may include a data field of an address. The data field may be formed by a number of bits equal to a number of CAN nodes connected to the bridge. Each bit may represent whether a given node of the nodes connected to the bridge is programmed to accept the message ID.

In some embodiments, the bridge may include a CAN controller and an Auto Bridge Ethernet ("ABE") module. When the control circuitry of the bridge receives the CAN message, the CAN message may be received at the CAN controller in a CAN protocol. The CAN controller may encapsulate the CAN message using an Ethernet protocol, may loop the encapsulated CAN message back to the CAN controller through the ABE, and may identify the virtual CAN bus identifier and the message ID of the CAN message from the looped back encapsulated CAN message.

The CAN message may be received from an Electronic Communications Unit ("ECU") of a node, and may be addressed to other ECUs of the node. Transmitting the CAN message to the node that satisfies the logical AND operation may first include control circuitry determining, based on the logical AND operation, whether the CAN message is addressed to another ECU of the node. In response to determining that the CAN message is addressed to another ECU of the node, the control circuitry may refrain from transmitting the CAN message.

In some embodiments, control circuitry of the bridge may receive another CAN message. The control circuitry may determine, using a CAN controller of the bridge, whether the another CAN message should be switched to a node different from the node from which the another CAN message was received. In response to determining that the another CAN message should not be switched to a node different from the node from which the another CAN message was received, the control circuitry may drop the another CAN message.

The CAN message is arbitrated using a CAN protocol until it is received by the bridge. The control circuitry, when transmitting the CAN message to the node that satisfies the logical AND operation, may transmit the CAN message using a best efforts protocol.

DETAILED DESCRIPTION

Systems and methods are disclosed herein for minimizing data transmission collisions on a CAN that cause lower priority ECUs to experience high latency in their data transmissions. A switched CAN environment is thus described herein, the switched CAN environment being one in which fewer ECUs are installed on buses where their communications are likely to collide with other communications from other ECUs, and where ECUs on different buses may communicate over a switched network. By virtue of the switched CAN environment, CAN messages are no longer broadcast to all ECUs of a CAN network, and instead are switched to ECUs of a targeted node.

Figure 1:
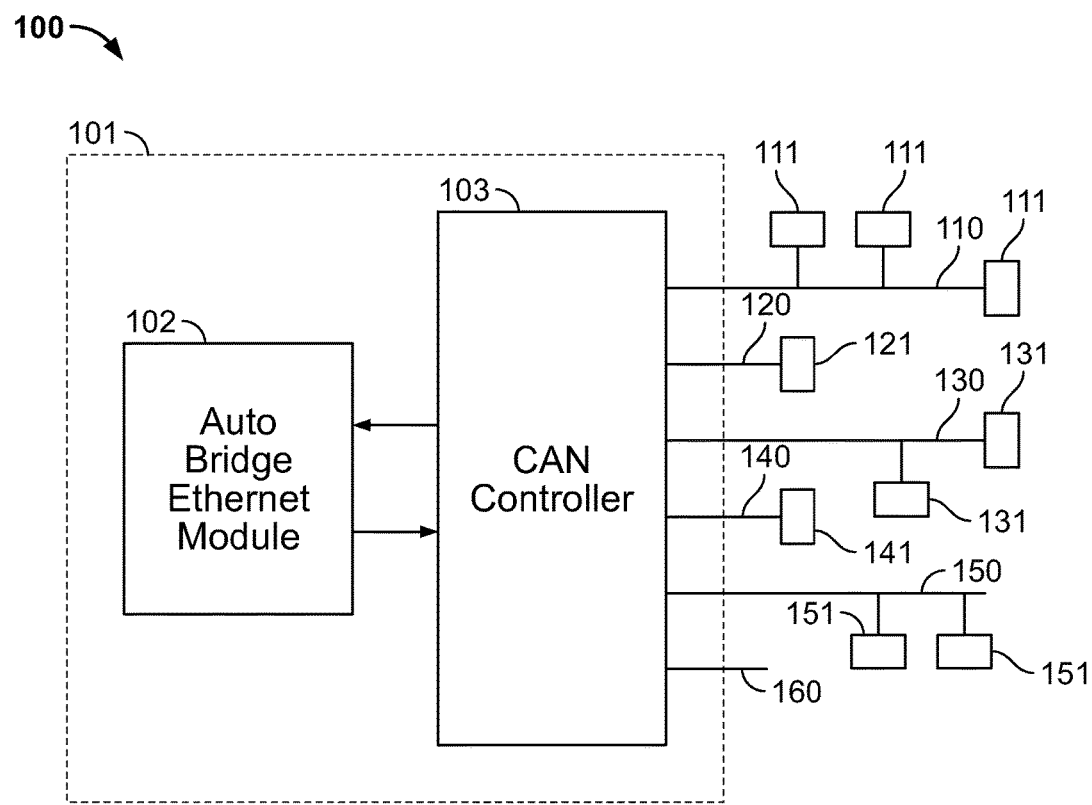
FIG. 1 depicts a switched CAN environment in which ECUs of a CAN are dispersed among a plurality of nodes, where the plurality of nodes are interconnected by way of a bridge, in accordance with some embodiments of the disclosure.

FIG. 1 depicts a switched CAN environment in which ECUs of a CAN are dispersed among a plurality of nodes, where the plurality of nodes are interconnected by way of a bridge, in accordance with some embodiments of the disclosure. Switched CAN environment 100 includes bridge 101, which includes Auto Bridge Ethernet module ("ABE") 102, and CAN controller 103. While ABE 102 is described with respect to Ethernet, ABE 102 may effect communication on any packet switching protocol, and is not limited to Ethernet. Nodes 110, 120, 130, 140, 150, and 160 are coupled to bridge 101 (e.g., by way of CAN controller 103), and can thus intercommunicate. Nodes 110, 120, 130, 140, 150, and 160 each include a separate CAN bus. ECUs 111, 121, 131, 141, and 151 are connected to nodes 110, 120, 130, 140, and 150, respectively, and may be any component that transmits electronic communications, such as an electronic component of an automobile. FIG. 1 is illustrative only; any number of ECUs and/or nodes may be included within switched CAN environment 100.

In some embodiments, ECUs that commonly intercommunicate may be coupled directly to a common node. For example, if ECUs 111 commonly intercommunicate, ECUs 111 may be arranged to communicate by way of node 110. This is advantageous because ECUs 121, 131, 141, and 151 will avoid collisions with the messages from ECUs 111 when transmitting messages of their own, as the messages will be transmitted on different nodes.

When a given ECU 111 attempts to transmit a CAN message to an ECU of a different node (e.g., ECU 121, of node 120), ECU 111 will broadcast a CAN message to all ECUs 111 of node 110. Bridge 101 will also receive the CAN message (e.g., using CAN controller 103) and will buffer the CAN message into ABE 102. In order to buffer the CAN message into ABE 102, CAN controller 103 may encapsulate the CAN message using a switched network protocol, such as Ethernet, and then transmit the encapsulated message to ABE 102. CAN controller 103 may receive the CAN message from node 110, and may buffer the CAN message as a message object. ABE 102 may read the message object from CAN controller 103, and may form a switched network (e.g., Ethernet) frame, and may encapsulate the CAN message in the switched network frame. ABE 102 will then switch the message to the destination node 121 (through a process to be described below), and ECU 121 will receive the message. Thus, nodes 130, 140, 150, and 160 will be unaffected by the broadcast message from ECU 111, resulting in a Switched CAN bus, instead of a broadcast environment.

In order to convert a broadcast CAN message to a switched message targeted to specific nodes, ABE 102 utilizes two lookup tables: a virtual CAN bus lookup table, and a message ID Lookup Table. The virtual CAN bus lookup table establishes a virtual CAN bus, which enables ECUs that are not on the same node as a recipient ECU to nevertheless transmit CAN messages that will reach the different ECU. In short, a virtual CAN bus creates a virtual CAN network, and ECUs on the virtual CAN bus are able to communicate as if they were on the same node. Thus, the virtual CAN bus lookup table includes a plurality of addresses, each address corresponding to a different virtual CAN network.

Each address of the virtual CAN bus lookup table has a data field formed of a number of bits corresponding to the number of nodes connected to bridge 101. Thus, in the case illustrated in switched CAN environment 100 of FIG. 1, each data field will have six bits. The first bit will correspond to node 110, the second bit will correspond to node 120, and so on. The bits will reflect which node is part of a virtual CAN bus by, for each address, using a "1" to reflect that a node is part of a virtual CAN bus, and using a "0" to reflect that a node is not part of a virtual CAN bus, or vice versa. For example, if an address is to reflect that nodes 110 and 120 are part of a virtual CAN bus, but that nodes 130, 140, 150, and 160 are not part of the virtual CAN bus, the data field of the address will be "110000" (or its inverse of "001111").

The message ID lookup table will have one address for each possible message ID of a CAN message. Thus, if the message ID lookup table supports 11-bit message IDs, the message ID lookup table will have 2048 addresses, one for each 11-bit message ID. Like the virtual CAN bus lookup table, the addresses of the message ID lookup table each have a data field with a number of bits corresponding to the number of nodes connected to bridge 101. The data field again uses the bits to identify which nodes are programmed to accept the message ID. So, if node 140 is the only node programmed to accept a particular message ID, then the data field for that address would reflect "000100" (or its inverse of "111011").

When ABE 102 receives a CAN message, the virtual CAN Bus ID of the CAN message is compared to the virtual CAN bus lookup table in order to find a matching address, and the message ID is also compared to the message ID lookup table to find a matching address. The data fields corresponding to each of the matching addresses are then identified. For example, the data field resulting from the virtual CAN bus ID comparison may be 110000, and the data field resulting from the message ID comparison may be 010001. This discrepancy may arise because multiple nodes might belong to a same virtual CAN bus, which is why there is more than one "1" in the data field of the virtual CAN bus lookup table. The discrepancy may also arise because the same message ID appears on multiple nodes, which may happen if the nodes are on different virtual CAN buses. Another possible reason for this discrepancy may be that the nodes represent a single virtual CAN bus, but multiple ECUs are able to receive the message (e.g., a broadcast message).

A logical AND operation is then performed on the two data fields in order to select a node to which the CAN message should be switched. Following from the example above, 110000 would have a logical AND operation performed against 010001, and would yield a result of 010000. Thus, the CAN message would be switched to node 120, which corresponds to the second bit of the data field. By performing a logical AND operation, we ensure that the CAN message is not only limited to being transmitted to nodes that are programmed to receive that particular message ID, but also to ensure that the message is only switched to those nodes that are part of the same virtual CAN bus that the transmitting node is a part of.

After the destination node is selected by way of the logical AND operation, ABE 102 may transmit the CAN message to CAN controller 103 with the destination node indicated in a message header, and CAN controller 103 may transmit the CAN message to the appropriate node(s). The net effect of this operation is that a CAN message on a legacy system would have had to have been broadcast to all ECUs with which the originating ECU was connected. However, by using Switched CAN Environment 100 and the operations described herein, the CAN message will only take up bandwidth of the node from which the CAN message originates, and the nodes to which the CAN message is targeted.

Figure 2:
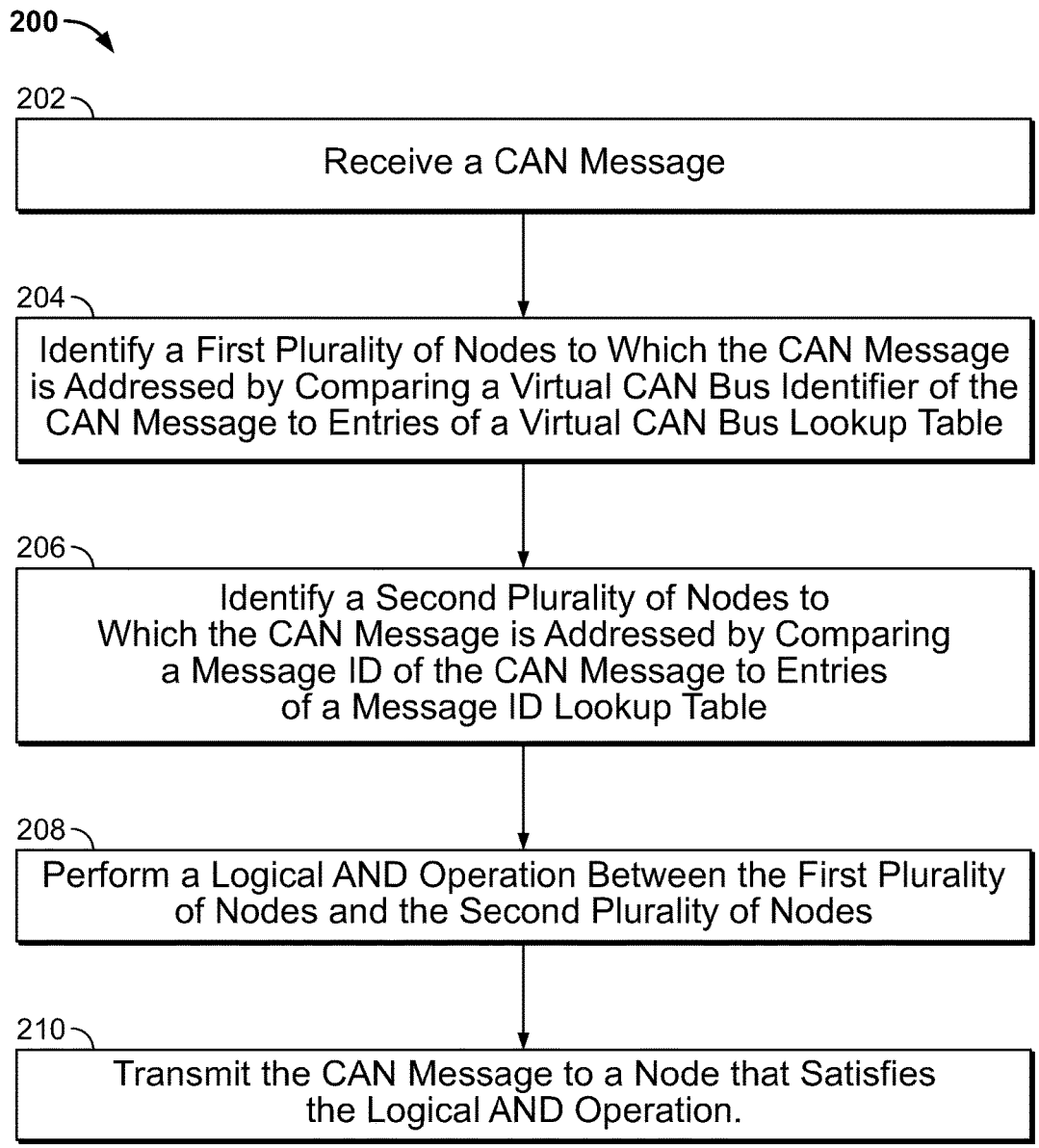
FIG. 2 depicts an illustrative flow chart for a process for implementing a switched CAN environment, in accordance with some embodiments of the disclosure.

FIG. 2 depicts an illustrative flow chart for a process for implementing a switched CAN environment, in accordance with some embodiments of the disclosure. Process 200 begins at 202, where control circuitry of a bridge (e.g., bridge 101) receives a CAN message. Optionally, upon receiving the CAN message, the control circuitry may encapsulate the CAN message (e.g., using CAN controller 103) into a switched network protocol (e.g., Ethernet).

At 204, control circuitry of the bridge may, e.g., using ABE 102, identify a first plurality of nodes to which the CAN message is addressed (e.g., a virtual CAN bus) by comparing a virtual CAN bus identifier of the CAN message to entries of a virtual CAN bus lookup table. The virtual CAN bus lookup table may be stored on memory of bridge 101, and may identify nodes (e.g., of nodes 110, 120, 130, 140, 150, and 160) which form a CAN bus identified by the virtual CAN bus identifier.

At 206, control circuitry of the bridge may, e.g., using ABE 102, identify a second plurality of nodes to which the CAN message is addressed by comparing a message identifier of the CAN message to entries of a message ID lookup table. Process 200 continues to 208, where the control circuitry of the bridge may perform a logical AND operation between the first plurality of nodes and the second plurality of nodes, as is described above with respect to FIG. 1. Process 200 may then continue to 210, where the control circuitry of the bridge may transmit the CAN message to a node that satisfies the logical AND operation.

The foregoing describes systems, methods, and apparatuses for configuring and implementing a switched CAN environment. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

What is claimed is:

1. A method for implementing a switched Controller Area Network ("CAN"), the method comprising:
    receiving, at a bridge, a CAN message;
    identifying a first plurality of nodes to which the CAN message is addressed by comparing a virtual CAN bus identifier of the CAN message to entries of a virtual CAN bus lookup table;
    identifying a second plurality of nodes to which the CAN message is addressed by comparing a message identifier ("ID") of the CAN message to entries of a message ID lookup table;
    performing a logical AND operation between a first set of data fields corresponding to the first plurality of nodes and a second set of data fields corresponding to the second plurality of nodes to identify a data field that belongs to both the first set and the second set; and
    transmitting the CAN message to a node that corresponds to the identified data field from the logical AND operation.

2. The method of claim 1, wherein the CAN message is a broadcast message, and wherein the logical AND operation converts the broadcast message to a switched message.

3. The method of claim 2, wherein the logical AND operation converts the broadcast message to the switched message by eliminating all but one node to which the CAN message is to be transmitted.

4. The method of claim 1, wherein each entry of the entries of the virtual CAN bus lookup table comprises a data field of an address, wherein the data field is formed by a number of bits equal to a number of CAN nodes connected to the bridge, and wherein each bit represents whether a given node of the nodes connected to the bridge forms a part of a virtual CAN bus.

5. The method of claim 1, wherein each entry of the entries of the message ID lookup table comprises a data field of an address, wherein the data field comprises a data field formed by a number of bits equal to a number of CAN nodes connected to the bridge, and wherein each bit represents whether a given node of the nodes connected to the bridge is programmed to accept the message ID.

6. The method of claim 1, wherein the bridge comprises a CAN controller and an Auto Bridge Ethernet ("ABE") module, wherein receiving, at the bridge, the CAN message comprises receiving the CAN message at the CAN controller in a CAN protocol, and wherein the method further comprises:
    encapsulating, using the CAN controller, the CAN message using an Ethernet protocol;
    looping the encapsulated CAN message back to the CAN controller through the ABE; and
    identifying the virtual CAN bus identifier and the message ID of the CAN message from the looped back encapsulated CAN message.

7. The method of claim 1, wherein the CAN message is received from an Electronic Communications Unit ("ECU") of a node, wherein the CAN message is addressed to other ECUs of the node, and wherein transmitting the CAN message to the node that satisfies the logical AND operation comprises:
    determining, based on the logical AND operation, whether the CAN message is addressed to another ECU of the node; and
    in response to determining that the CAN message is addressed to another ECU of the node, refraining from transmitting the CAN message.

8. The method of claim 1, wherein the method further comprises:
    receiving, at the bridge, another CAN message;
    determining, using a CAN controller of the bridge, whether the another CAN message should be switched to a node different from the node from which the another CAN message was received; and in response to determining that the another CAN message should not be switched to a node different from the node from which the another CAN message was received, dropping the another CAN message.

9. The method of claim 1, wherein the CAN message is arbitrated using a CAN protocol until it is received by the bridge.

10. The method of claim 9, wherein transmitting the CAN message to the node that satisfies the logical AND operation comprises transmitting the CAN message using a best efforts protocol.

11. A system for implementing a switched Controller Area Network ("CAN"), the system comprising:
- a plurality of nodes; and
- a bridge, wherein the bridge is coupled to the plurality of nodes, wherein the bridge comprises memory, and wherein the bridge comprises control circuitry configured to:
- receive a CAN message;
- identify a first plurality of nodes to which the CAN message is addressed by comparing a virtual CAN bus identifier of the CAN message to entries of a virtual CAN bus lookup table, wherein the virtual CAN bus lookup table is stored in the memory;
- identify a second plurality of nodes to which the CAN message is addressed by comparing a message identifier ("ID") of the CAN message to entries of a message ID lookup table, wherein the message ID lookup table is stored in the memory;
- perform a logical AND operation between a first set of data fields corresponding to the first plurality of nodes and a second set of data fields corresponding to the second plurality of nodes to identify a data field that belongs to both the first set and the second set; and
- transmit the CAN message to a node that corresponds to the identified data field from the logical AND operation.

12. The system of claim 11, wherein the CAN message is a broadcast message, and wherein the logical AND operation converts the broadcast message to a switched message.

13. The system of claim 12, wherein the logical AND operation converts the broadcast message to the switched message by eliminating all but one node to which the CAN message is to be transmitted to.

14. The system of claim 11, wherein each entry of the entries of the virtual CAN bus lookup table comprises a data field of an address, wherein the data field is formed by a number of bits equal to a number of CAN nodes connected to the bridge, and wherein each bit represents whether a given node of the nodes connected to the bridge forms a part of a virtual CAN bus.

15. The system of claim 11, wherein each entry of the entries of the message ID lookup table comprises a data field of an address, wherein the data field comprises a data field formed by a number of bits equal to a number of CAN nodes connected to the bridge, and wherein each bit represents whether a given node of the nodes connected to the bridge is programmed to accept the message ID.

16. The system of claim 11, wherein the bridge comprises a CAN controller and an Auto Bridge Ethernet ("ABE") module, wherein receiving, at the bridge, the CAN message comprises receiving the CAN message at the CAN controller in a CAN protocol, and wherein the control circuitry of the bridge is further configured to:
- encapsulate, using the CAN controller, the CAN message using an Ethernet protocol;
- loop the encapsulated CAN message back to the CAN controller through the ABE; and
- identify the virtual CAN bus identifier and the message ID of the CAN message from the looped back encapsulated CAN message.

17. The system of claim 11, wherein the CAN message is received from an Electronic Communications Unit ("ECU") of a node, wherein the CAN message is addressed to other ECUs of the node, and wherein the control circuitry of the bridge is further configured, when transmitting the CAN message to the node that satisfies the logical AND operation, to:
- determine, based on the logical AND operation, whether the CAN message is addressed to another ECU of the node; and
- in response to determining that the CAN message is addressed to another ECU of the node, refrain from transmitting the CAN message.

18. The system of claim 11, wherein the control circuitry of the bridge is further configured to:
- receive another CAN message;
- determine, using a CAN controller of the bridge, whether the another CAN message should be switched to a node different from the node from which the another CAN message was received; and
- in response to determining that the another CAN message should not be switched to a node different from the node from which the another CAN message was received, drop the another CAN message.

19. The system of claim 11, wherein the CAN message is arbitrated using a CAN protocol until it is received by the bridge.

20. The system of claim 19, wherein transmitting the CAN message to the node that satisfies the logical AND operation comprises transmitting the CAN message using a best efforts protocol.

* * * * *